(12) United States Patent
Shimizu et al.

(10) Patent No.: US 6,990,263 B2
(45) Date of Patent: Jan. 24, 2006

(54) CONNECTOR-INTEGRATED TYPE POLYMER OPTICAL WAVEGUIDE, METHOD AND MOLD FOR PRODUCING THE SAME

(75) Inventors: Keishi Shimizu, Ashigarakami-gun (JP); Shigemi Ohtsu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 36 days.

(21) Appl. No.: 10/862,324

(22) Filed: Jun. 8, 2004

(65) Prior Publication Data

US 2004/0252932 A1    Dec. 16, 2004

(30) Foreign Application Priority Data

Jun. 11, 2003    (JP)    ............................. 2003-166485

(51) Int. Cl.
*G02B 6/12*    (2006.01)

(52) U.S. Cl. ........................... 385/14; 385/49; 385/53; 385/141

(58) Field of Classification Search ................. 385/14, 385/49–51, 53, 141–145; 257/499–564
See application file for complete search history.

(56) References Cited

U.S. PATENT DOCUMENTS 6,324,323 B1 * 11/2001 Benham et al. ............... 385/49
6,355,198 B1    3/2002 Kim et al. ................ 264/259

FOREIGN PATENT DOCUMENTS

| JP | A 59-232312 | 12/1984 |
|---|---|---|
| JP | A 11-202157 | 7/1999 |
| JP | B2 3029428 | 2/2000 |
| JP | B2 3151364 | 1/2001 |

OTHER PUBLICATIONS

Whitesides et al., "The Art of Building Small: Researchers are Discovering Cheap, Efficient Ways to Make Structures Only a Few Billionths of a Meter Across," *Scientific American*, pp. 39-47 (Sep. 2001).
Michel et al., "Printing Meets Lithography: Soft Approaches to High-Resolution Patterning," *IBM J. RES. & DEV.*, vol. 45, No. 5, pp. 697-719 (Set. 2001).

* cited by examiner

*Primary Examiner*—Phan T. H. Palmer
(74) *Attorney, Agent, or Firm*—Oliff & Berridge, PLC

(57) ABSTRACT

The present invention provides a connector-integrated type polymer optical waveguide, comprising: an optical waveguide including a film substrate for clad, an optical waveguide core provided on the film substrate, and a clad layer formed on side faces and a top face of the core; a pair of connector sleeves formed at positions at which the connector sleeves sandwich the optical waveguide core at least in one end portion of the polymer optical waveguide; and a rigid member for connector formation, wherein the film substrate for clad and the connector sleeves are fixed to the rigid member for connector formation in such a state that the center of the optical waveguide core and the center for connector sleeves are substantially on the same plane. The present invention also provides a method for producing the above-mentioned connector-integrated type polymer optical waveguide and a mold to be used for the method.

20 Claims, 8 Drawing Sheets

CONNECTOR-INTEGRATED TYPE POLYMER OPTICAL WAVEGUIDE, METHOD AND MOLD FOR PRODUCING THE SAME

CROSS-REFERENCE TO RELATED APPLICATION

This application claims priority under 35 USC 119 from Japanese Patent Application No. 2003-166485, the disclosures of which are incorporated by reference herein.

BACKGROUND OF THE INVENTION

1. Field of the Invention

The present invention relates to a connector-integrated type polymer optical waveguide and a method of producing the optical waveguide.

2. Description of the Related Art

The following methods have been proposed as a polymer optical waveguide production method: (1) a method (selective polymerization method) of impregnating a film with a monomer, selectively exposing the core portion of the film for changing the refractive index thereof, and forming a laminate by using the film; (2) a method (RIE method) of forming a core layer and a clad layer by coating and then forming a clad portion by reactive ion etching; (3) a photolithographic method (direct exposure method) of carrying out exposure and development by using a UV curable resin prepared by adding a photosensitive material in a polymer material; (4) a method of employing an extrusion molding method; (5) a method (photo-bleaching method) of forming a core layer and a clad layer and then changing the refractive index of the core portion by effecting exposure of the core portion.

However, the selective polymerization method (1) has a problem in the lamination process, the methods (2) and (3) are costly because of the employment of the photolithography, and the method (4) has a problem in the precision of the diameter of the obtained core. Further, the method (5) has a problem that sufficiently large difference in refractive index cannot be obtained between the core layer and the clad layer.

Presently, the practically applicable methods are only the methods (2) and (3) and even these methods have the above-mentioned problem, in terms of the cost. None of the methods (1) to (5) is satisfactorily applicable to formation of a polymer optical waveguide on a flexible plastic substrate having a large surface area.

As a method for producing a polymer optical waveguide, there has been known a method comprising: filling a patterned substrate (a clad) having a groove pattern, which are to be capillary, with a polymer precursor material for a core; curing the material for forming a core layer, and then laminating a flat substrate (a clad) thereon. However, in this method, the polymer precursor material is thinly filled and cured to form a thin layer having the same composition as that of the core layer, not only in the capillary groove but also the entire surface between the patterned substrate and the flat substrate. Consequently, there arises a problem in that the light leaks out through the thin layer.

As a method for solving the above-mentioned problem, David Hart has proposed a method (Japanese Patent Publication No. 3,151,364) for producing a polymer optical waveguide by fixing a patterned substrate having a groove pattern, which are to be capillary, and the flat substrate with a clamp, sealing the contact part of the patterned substrate and the flat substrate with a resin, decreasing the pressure therein, and then filling the capillary with a monomer (diallyl isophthalate) solution.

In this method, a monomer is used in place of the polymer precursor material as the resin material for forming a core, to lower the viscosity of the filling material, and the filling material is filled in the capillary by utilizing the capillary phenomenon such that the monomer is not filled in no portion other than the capillary.

However, since the method uses the monomer as the core formation material, there arises a problem in that the volume shrinkage rate at the time when the monomers are polymerized to be a polymer is large and the transmission loss in the polymer optical waveguide is high.

Also, the method is a somewhat troublesome method including the processes of fixing the patterned substrate and the flat substrate by a clamp and, in addition to that, sealing the contact part thereof with a resin. In short, this method is unsuitable for mass production and, as a result, cost down cannot be achieved. Further, it is impossible for this method to be applied to production of a polymer optical waveguide using a film whose thickness is of mm order or a film whose thickness of 1 mm or less as a clad.

Further, recently, George M. Whitesides, et al, of Harvard University, have proposed, as a new technology for producing a nano-structure, a method which is called "capillary tube micro-mold" as one method of soft lithography. Specifically, this method includes the processes of: producing a master substrate by utilizing photolithography, transferring the nano-structure of the master substrate to a mold made of polydimethylsiloxane (PDMS) based on the good adhesion (but easily separatable) property of PDMS, charging the mold with a liquid polymer by utilizing the capillary phenomenon, and curing the polymer. A detailed commentary article on this method is found in SCIENTIFIC AMERICAN SEPTEMBER 2001 (Nikkei Science December 2001).

Further, Kim Enoch, et al, of the group of George M. Whitesides of Harvard University, have been granted a patent application regarding the capillary micro-mold method (refer to U.S. Pat. No. 6,355,198).

However, when the above-mentioned patent of Enoch et al. is applied to production of a polymer optical waveguide, as the cross-sectional surface area of the core portion of the optical waveguide is small, it takes a long time to form the core portion and thus the method is not suitable for mass production. Further, when the monomer in the solution is polymerized to be a polymer, a significant change in volume occurs and the core shape is changed, whereby the transmission loss is disadvantageously increased.

B. Michel, et al, of IBM Zurich Research Laboratory have proposed a lithographic technique with a high resolution, which technique utilizes PDMS, and reported that resolution force of several ten nm-order can be obtained by the technique. Detailed commentary article thereon is disclosed in IBM J. REM. & DEV, VOL. 45, NO.5, SEPTEMBER (2001).

As described, in recent years, much attention has been paid mainly in the United States to the soft lithographic technology using PDMS and capillary micro-mold method as nano-technology.

However, when an optical waveguide is produced by using the micro-mold as described above, it is impossible to simultaneously achieve both lowering the volume shrinkage rate (i.e., reducing the transmission loss) at the time of curing and lowering the viscosity of the filling liquid (monomer or the like) to facilitate the filling. Accordingly, if priority is put on reducing the transmission loss, the viscosity cannot be lowered to a certain degree and the filling rate is low, whereby mass production is impossible.

Further, the micro-mold method described above is based on use of a glass or silicon substrate as a substrate. In other words, use of a flexible film substrate cannot be used in the micro-mold method.

On the contrary, inventors of the present invention have proposed, as Japanese Patent Application No. 2002-187473, a method for producing a flexible polymer optical waveguide comprising an optical waveguide on a film substrate at a very low cost.

The polymer optical waveguide produced by this method has little transmission loss and keeps a highly precise core shape and since it is flexible as a whole, it can be disposed in a desired manner in a variety of appliances. In this method, in order to enhance the degree of integration of circuits, it is effective to form a layered structure in which polymer optical waveguides are laminated on one another or a structure in which an optical waveguide is laminated on an electric circuit board. However, it is necessary to bond an optical connector such as an MT connector to an end portion of a waveguide in order to easily connect the flexible polymer optical waveguide with an optical fiber array. This bonding process generally requires highly advanced alignment adjustment to consequently increase the cost.

Regarding a connection member for connecting an optical fiber and a polymer optical waveguide, Japanese Patent No. 3,029,428 discloses an optical waveguide device for optical wiring comprising a connector for connecting an optical fiber by guide pins without core, a polymer optical waveguide, wherein the connector is connected to an end of the polymer optical waveguide, the connector is composed of two connector parts disposed to face each other, a polymer optical waveguide-mounting groove for mounting a polymer optical waveguide and two guide pin-mounting grooves for mounting the guide pins are formed on the faces of the connector parts facing each other, the polymer optical waveguide is sandwiched between the two connector parts, thereby integrally joining the polymer optical waveguide and the two connector parts.

However, the connector parts have complicated shapes and the groove must be produced with high precision, whereby producing the above-described optical waveguide device for optical wiring is with low cost is impossible.

Japanese Patent Application Laid-Open (JP-A) No. 11-202157 discloses an optical waveguide member comprising a substrate in which a waveguide and a groove for fixing an optical fiber for input and output are formed on the same optical axis, an optical fiber fixed in the groove of the substrate and having an optical connector at the terminal end thereof, and a container for holding the substrate and optical fiber. In the case of this optical waveguide member, the optical fiber-attached connector is costly.

Further, JP-A No. 59-232312 discloses a structure in which a connection portion of a recessed shape for guiding insertion of an optical fiber is provided in a main body of a polymer optical waveguide for connecting the light-guiding paths of the optical waveguide with the optical fiber. However, in the case of the above-described structure, there arise problems in that the method for producing the connection portion is subjected to restriction and that that precision in the connection is not so high.

SUMMARY OF THE INVENTION

In consideration of the above-mentioned problems, the present invention provides a connector-integrated type poly- mer optical waveguide with excellent structure stability and a production method which allows easy and inexpensive production with a less number processes, of the connector-integrated type polymer optical waveguide.

The object of the invention can be achieved by providing the following connector-integrated type polymer optical waveguides and the production methods and molds to be employed for the production methods.

(1) A connector-integrated type polymer optical waveguide, comprising: an optical waveguide including a film substrate for clad, an optical waveguide core provided on the film substrate, and a clad layer formed on side faces and a top face of the core; a pair of connector sleeves formed at positions at which the connector sleeves sandwich the optical waveguide core at least in one end portion of the polymer optical waveguide; and a rigid member for connector formation, wherein the film substrate for clad and the connector sleeves are fixed to the rigid member for connector formation in such a state that the center of the optical waveguide core and the center for connector sleeves are substantially on the same plane.

(2) The connector-integrated type polymer optical waveguide described in (1), wherein the non-fixed face sides of the clad layer and the pair of the connector sleeves are fixed by another rigid member for connector formation.

(3) The connector-integrated type polymer optical waveguide described in (1), wherein the film substrate for clad and the connector sleeves are fixedly attached to the rigid member for connector formation with an adhesive.

(4) The connector-integrated type polymer optical waveguide described in (1), wherein the rigid member for connector formation has a fixation face of a shape substantially corresponding to the pair of the connector sleeves and the film substrate for clad.

(5) The connector-integrated type polymer optical waveguide described in (1), wherein the rigid member for connector formation is a press-machined product of a metal plate, a molded body of a resin or a mixture of a resin and a metal, a molded body of glass, or a sintered molded body of ceramic.

(6) The connector-integrated type polymer optical waveguide described in (1), wherein the connector sleeves are made of a material selected from the group consisting of zirconia, nickel, stainless steel, a resin, a mixture of a resin and a metal, and a crystallized glass.

(7) A method of producing a connector-integrated type polymer optical waveguide, comprising: <1> preparing a mold made of a cured resin layer of a curable resin for mold formation and having a recessed portion corresponding to a projected portion of an optical waveguide core and recessed portions for receiving at least one pair of connector sleeves; <2> closely attaching a film substrate for clad to the mold; <3> filling the recessed portion corresponding to the projected portion of the optical waveguide core in the mold having the film substrate for clad closely attached thereon, with a curable resin for core formation; <4> curing the charged curable resin for core formation; <5>mounting connector sleeves in the recessed portions for receiving connector sleeves in the mold; <6> fixing a rigid member for connector formation to the connector sleeves and the film substrate for clad with an adhesive layer; <7> separating the mold from the film substrate for clad; and <8> forming a clad layer on side faces and a top face of the formed optical waveguide core, wherein the mold is adapted such that, when the connector sleeves are set in the recessed portions for receiving the connector sleeves in the process <5>, the center of the recessed portion corresponding to the projected portion of the optical waveguide core and the center of the connector sleeves are substantially on the same plane.

(8) The connector-integrated type polymer optical waveguide production method described in (7), wherein the process <5> of mounting the connector sleeves in the recessed portions for receiving connector sleeves in the mold is carried out after the process <1> of preparing the mold and before the process <6> of fixing the rigid member for connector formation to the connector sleeves and the film substrate for clad.

(9) The connector-integrated type polymer optical waveguide production method as described in (7), wherein the mold is produced from a master plate having the projected portion corresponding to the optical waveguide core and the projected portions for forming the recessed portions for receiving the connector sleeves.

(10) The connector-integrated type polymer optical waveguide production method described in (9), wherein the center of the projected portion corresponding to the optical waveguide core and the center for the projected portions for forming the recessed portions for receiving the connector sleeves, of the master plate, are substantially on the same plane.

(11) The connector-integrated type polymer optical waveguide production method described in (9), wherein the projected portions for forming the recessed portions of for receiving the connector sleeves are formed in the master plate by using a projected portion for positioning.

(12) The connector-integrated type polymer optical waveguide production method described in (7), wherein the curable resin for core formation is a UV curable resin and UV rays are irradiated by way of the film substrate for clad or the mold in the normal direction with respect to the film substrate for clad in the process <4>.

(13) The connector-integrated type polymer optical waveguide production method described in (7), wherein the adhesive is a curable adhesive of room temperature curing type.

(14) The connector-integrated type polymer optical waveguide production method described in (7), wherein at least the surfaces of the recessed portion corresponding to the projected portion of the optical waveguide core and the recessed portions for receiving the connector sleeves and the vicinities thereof, of the cured resin layer of the mold, are formed by a cured product of a liquid silicone rubber.

(15) A connector-integrated type polymer optical waveguide production method, comprising: <1> preparing a mold made of a cured resin layer of a curable resin for mold formation and having a recessed portion corresponding to a projected portion of an optical waveguide core and recessed portions for receiving at least one pair of connector sleeves; <2> closely attaching a film substrate for clad to the mold; <3> filling the recessed portion corresponding to the projected portion of the optical waveguide core in the mold having the film substrate for clad closely attached thereon, with a curable resin for core formation; <4> curing the charged curable resin for core formation; <5> mounting the connector sleeves in the recessed portions for receiving connector sleeves in the mold; and <6> fixing a rigid member for connector formation to the connector sleeves and the film substrate for clad with an adhesive layer, wherein the cured resin layer of the curable resin for the mold formation is light transmissible and the difference in the refractive index between the cured resin layer and the core formed in the process <4> is 0.01 or more, and the mold is adapted such that, when the connector sleeves are set in the recessed portions for receiving the connector sleeves in the process <5>, the center of the recessed portion corresponding to the projected portion of the optical waveguide core and the center of the connector sleeves are substantially on the same plane.

(16) A mold having: a recessed portion corresponding to a projected portion of an optical waveguide core; and recessed portions for receiving connector sleeves, wherein the mold is adapted such that, when connector sleeves are set in the recessed portions, the center of the recessed portion corresponding to the projected portion of the optical waveguide core and the center of the connector sleeves are substantially on the same plane.

DETAILED DESCRIPTION OF THE INVENTION

[Connector-Integrated Type Polymer Optical Waveguide]

A connector-integrated type polymer optical waveguide, comprises: a flexible polymer optical waveguide including a film substrate for clad, an optical waveguide core provided on the film substrate, and a clad layer formed on side faces and a top face of the core; a pair of connector sleeves formed at positions at which positions the connector sleeves sandwich the optical waveguide core at least in one end portion of the polymer optical waveguide; and a rigid member for connector formation, wherein the film substrate for clad and the connector sleeves are fixed in the rigid member for connector formation in such a state that the center of the optical waveguide core and the center for connector sleeves are substantially on the same plane.

The connector-integrated type polymer optical waveguide of the invention is excellently stable in structural terms, due to the pair of connector sleeves provided in at least one end portion thereof and the rigid member for connector formation for integrally fixing the pair of connector sleeves and the film substrate for clad. As the rigid member for connector formation is provided at an end portion of the polymer optical waveguide and the rest of the portions of the polymer optical waveguide remains flexible, the connector-integrated type polymer optical waveguide of the invention has considerable degree of freedom.

The above-mentioned connector sleeves may be formed either in one end portion or in both end portions (in the longitudinal direction) of the polymer optical waveguide. Hereinafter, the example in which the connector sleeves are provided in both ends of a polymer optical waveguide will be described.

Figure 1A:
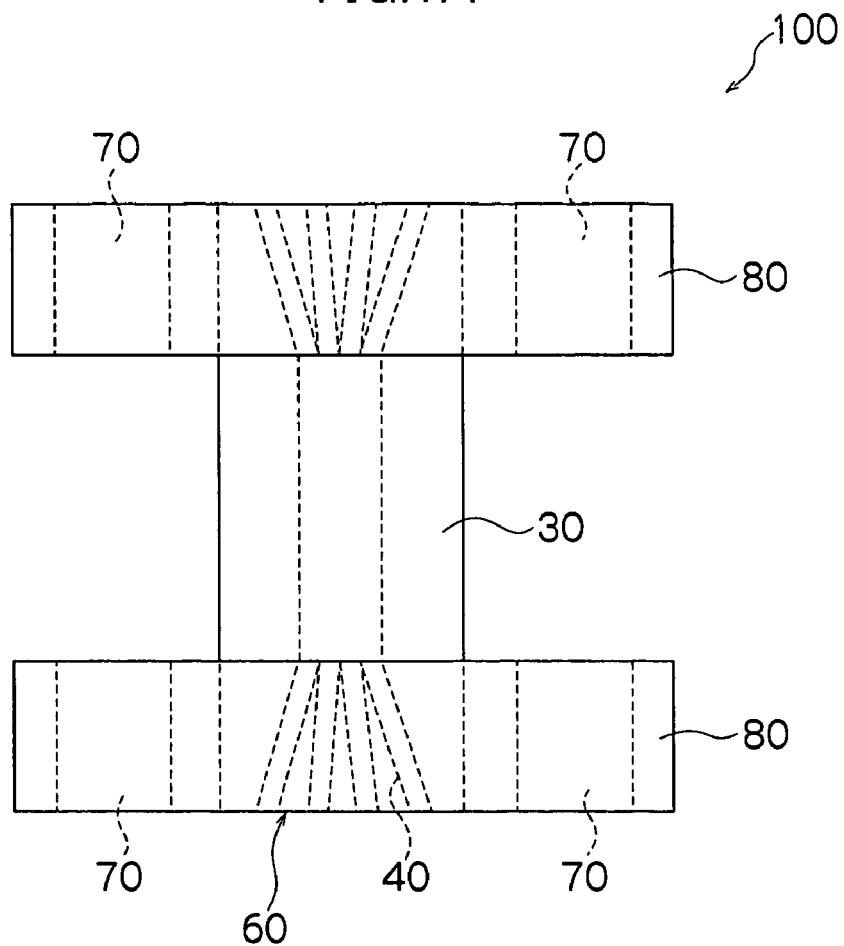
FIG. 1A is a plan view showing one example of a connector-integrated type polymer optical waveguide of the present invention.
Figure 1B:
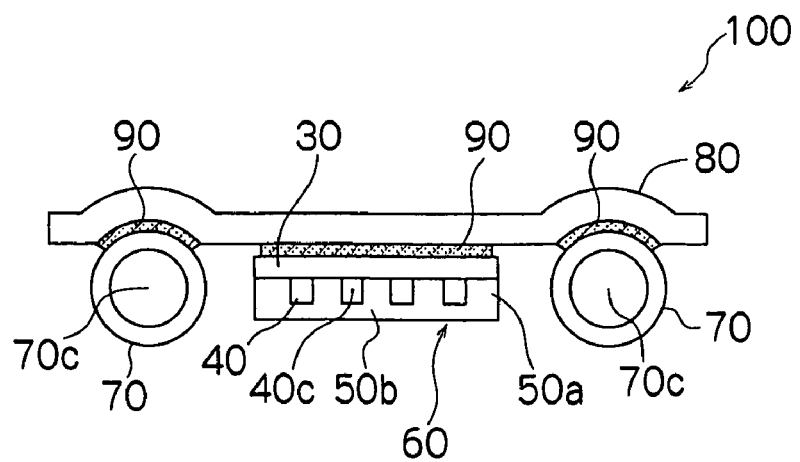
FIG. 1B is a cross-sectional view of an end portion of one example of a connector-integrated type polymer optical waveguide of the invention.

At first, a connector-integrated type polymer optical waveguide of the invention will be described with reference to drawings. FIGS. 1A and 1B are schematic illustrations of one example of a connector-integrated type polymer optical waveguide 100 of the invention. FIG. 1A is a plan view of the connector-integrated type polymer optical waveguide and FIG. 1B is a cross-sectional view of an end portion of the connector-integrated type polymer optical waveguide of FIG. 1A.

In FIGS. 1A and 1B, 30 represents a film substrate for clad; 40 represents an optical waveguide core; 40c represents the center of the optical waveguide core; 50a represents a side face clad layer; 50b represents a top face clad layer; 60 represents a polymer optical waveguide; 70 represents a connector sleeve; 70c represents the center of the sleeve; 80 represents a rigid member for connector formation; and 90 represents an adhesive layer. Four optical waveguide core centers 40c and two sleeve centers 70c are positioned substantially on the same plane.

In the invention, the above-described expression of "being positioned substantially on the same plane" represents that, in FIG. 1B, a straight line linking the two sleeve centers 70c is no more than 5 μm distanced from a straight line linking the four optical waveguide core centers 40c.

Figure 2:
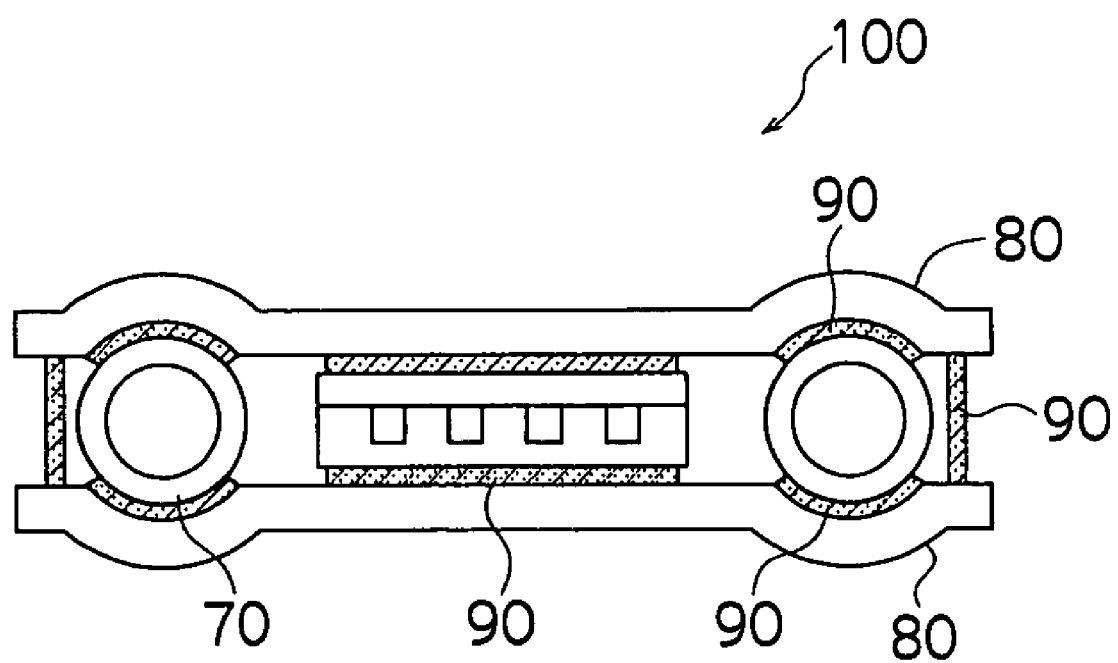
FIG. 2 is a cross-sectional view of an end portion of another example of a connector-integrated type polymer optical waveguide of the invention.

FIG. 2 shows a connector-integrated type polymer optical waveguide with a constitution where non-fixed face side of the clad layer (50b) and the pair of connector sleeves shown in FIG. 1A and FIG. 1B is fixed by another rigid member for connector formation. The optical waveguide with this constitution has higher structural stability than that of FIGS. 1A and 1B.

A method of producing a connector-integrated type polymer optical waveguide of the invention includes the following processes (1) to (8):

<1> preparing a mold made of a cured resin layer of a curable resin for mold formation and having a recessed portion corresponding to a projected portion of an optical waveguide core and recessed portions for receiving at least one pair of connector sleeves;
<2> closely attaching a film substrate for clad to the mold;
<3> filling the recessed portion corresponding to the projected portion of the optical waveguide core in the mold having the film substrate for clad closely attached thereon, with a curable resin for core formation;
<4> curing the charged curable resin for core formation;
<5> mounting connector sleeves in the recessed portions for receiving connector sleeves in the mold;
<6> fixing a rigid member for connector formation to the connector sleeves and the film substrate for clad with an adhesive layer;
<7> separating the mold from the film substrate for clad; and
<8> forming a clad layer on side faces and a top face of the formed optical waveguide core, wherein the mold is adapted such that, when the connector sleeves are set in the recessed portions for receiving the connector sleeves in the process <5>, the center of the recessed portion corresponding to the projected portion of the optical waveguide core and the center of the connector sleeves are substantially on the same plane. Further, the process <5> of mounting the connector sleeves in the recessed portions for receiving connector sleeves in the mold may be carried whenever after the process <1> of preparing the mold and before the process (6) of fixing the rigid member for connector formation to the connector sleeves and the film substrate for clad.

Hereinafter, with regard to one example of the production method of the connector-integrated type polymer optical waveguide of the invention, the scheme thereof will be described in order of the processes. Although an example having the connector sleeves and the rigid member for connector formation formed in one end portion of the polymer optical waveguide is shown in this example, it should be noted that a connector-integrated type polymer optical waveguide can be produced in a similar manner with the connector sleeves and the rigid member for connector formation formed in both end portions of the polymer optical waveguide.

[Production of the Mold]

At first, a mold made of a cured resin layer of a curable resin for mold formation and having a recessed portion corresponding to a projected portion of an optical waveguide core and recessed portions for receiving at least one pair of connector sleeves is prepared. The preparation of the mold is preferably carried out by using a master plate having a projected portion corresponding to the optical waveguide core and projected portions for forming the recessed portions for receiving the connector sleeves formed thereon.

In the production method of the connector-integrated type polymer optical waveguide of the invention, the relative positional relationship between the sleeves and the recessed portion corresponding to the projected portion of the optical waveguide core, when the connector sleeves are set in the recessed portions for receiving the connector sleeves in the mold, is directly represents the relative positional relationship between the connector sleeves and the optical waveguide core in the connector-integrated type polymer optical waveguide of the invention.

Accordingly, it is important that, the center of each sleeve and the center of each recessed portion corresponding to the projected portion of the optical waveguide core in the mold are positioned so as to be substantially on the same plane when the sleeves are set in the recessed portions for receiving the connector sleeves in the mold.

Figure 5A:
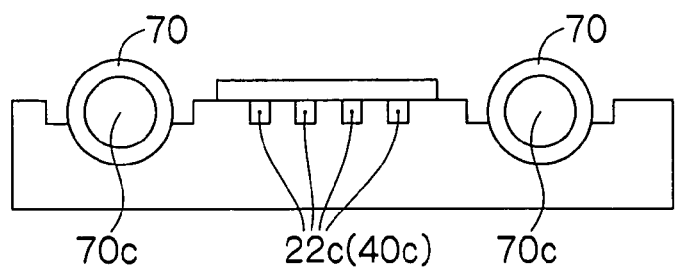
FIGS. 5A to 5E are conceptual illustrations, respectively showing the processes of producing a connector-integrated type polymer optical waveguide of the invention (the processes from setting sleeves in the recessed portions of a mold to attaching a rigid member for connector formation, to form a clad layer).

FIG. 5A shows the state that the sleeves are set in the recessed portions for receiving the connector sleeves in the mold after the core formation. Herein, the center of each sleeve and the center 22c (which also represents the core center 40c) of each recessed portion corresponding to the projected portion of the optical waveguide are substantially one the same plane with an error within 5 μm or so. At the time of producing the projected portions for forming the recessed portions for receiving the connector sleeves in the master plate, it is necessary to achieve such a state as illustrated in FIG. 5A (i.e., a state in which the center of each sleeve and the center of each recessed portion corresponding to the projected portion of the optical waveguide core in the mold are substantially on the same plane).

Examples of a method for producing a master plate having a projected portion corresponding to the optical waveguide core and projected portions for forming the recessed portions for receiving the connector sleeves (the sleeve-mounting recessed portions) formed thereon include following methods.

Figure 3A:
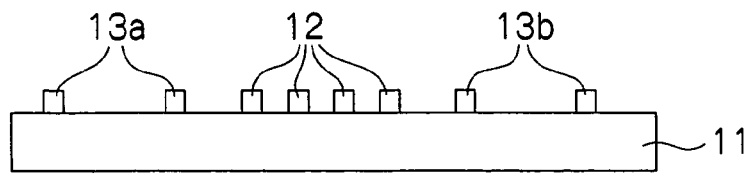
FIGS. 3A to 3D are conceptual illustrations, respectively showing the processes of producing a connector-integrated type polymer optical waveguide of the invention (the processes from preparation of the master plate to mold production).
Figure 3B:
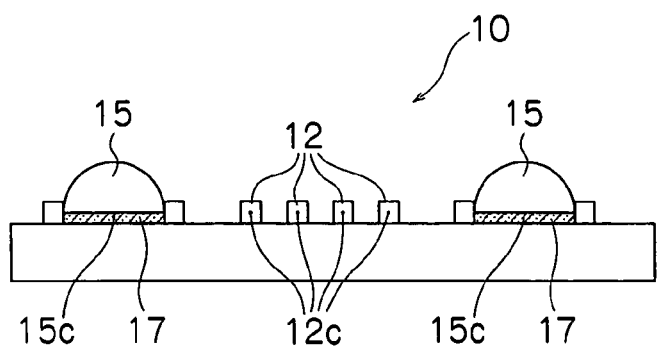

With reference to FIGS. 3A and 3B showing the master plate production processes, one example of the method for producing a master plate will be described. FIG. 3B shows a cross-sectional view of a master plate for mold formation.

In FIG. 3B, 12 represents a projected portion corresponding to the optical waveguide core and a pin 15 attached to a master plate 11 by an adhesive layer 17 is a projected portion for forming a recessed portion for receiving a sleeve. The pin has shape and size corresponding to a structure of a piece obtained by equally cutting, in the longitudinal direction, the sleeve to be received in the recessed portion of the mold. The pin shown in FIG. 3B represents a structure corresponding to the cylindrical connector sleeve (in FIG. 3B, the pin 15 has been cut so as to exhibit a semicircular section which corresponds to the cylindrical connector sleeve.

In FIG. 3B, 15c represents the center of the semicircular cross-section of each pin; 12c represents the center of the projected portion corresponding to the center of the optical waveguide core. 15c and 12c are substantially on the same plane.

Since the connector sleeve has the shape and size (generally in mm order) adapted to insertion of a guide pin or the like of an MT connector and thus the dimensional order (mm) thereof is different from that of the core diameter (generally in $\mu$m order), the projected portion for forming a recessed portion for receiving a sleeve cannot be formed, in general, by a conventional photolithographic method.

Therefore, there can be employed a method in which, as shown in FIG. 3A, a master plate on which the projected portion 12 corresponding to the optical waveguide core and the projected portions 13a, 13a, 13b, and 13b for positioning two pairs of pins have been formed is prepared and pins are positioned between the paired projected portions for pin positioning, and then the pins are stuck to the master plate by an adhesive.

In this case, if the thickness of the adhesive is assumed to be negligible, the center 15c of the semicircular cross-section of the pin (corresponding to the sleeve center when the sleeve is received in the recessed portion for receiving the connector sleeve in the mold) is offset by a half length of the core height from the center 12c of the projected portion of the optical waveguide core (corresponding to the core center).

Accordingly, in the case a master plate is produced by using this mold, when the sleeve is set in the recessed portion for receiving the sleeve in the mold, the sleeve center and the core center are offset from each other by the half length of the core height.

In other words, the center of the semicircular cross-section of the pin and the core center can be made to be substantially on the same plane by adjusting the thickness of the adhesive. Accordingly, the center 15c of the semicircular cross-section of the pin and the center 12c of the projected portion of the optical waveguide core can be made to be substantially on the same plane (that is, the center of the sleeve and the core center can be made substantially on the same plane) by adjusting the thickness of the adhesive layer.

Further, if the self-weight of the sleeve and, in addition to that, an influence of the rigid member for connector formation which will be described later cannot be ignored in terms of the deformation of the mold, the degree of the deformation of the mold may be computed by calculation from the physical properties of the mold or obtained from simulated experiments, so that the thickness of the adhesive layer may be corrected based on the computed value.

In a production method of a connector-integrated type polymer optical waveguide of the invention, as described above, only by forming a recessed portion for receiving a sleeve in the mold and adjusting the thickness of an adhesive layer provided on a pin, the center of each sleeve and the center of the optical wave guide core can be made to substantially on the same plane.

Accordingly, in the invention, it is not necessary to optically adjust the relative positions of the sleeves and the optical waveguide core by using, for example, an alignment mark. Further, it is not necessary to carry out a process of adjusting the relative positions of the sleeves and the waveguide by actually passing light through the optical wave guide and then fixing the sleeves and the waveguide. The relative positions of the sleeves and the waveguide are determined by the mold, and the rigid member for connector formation (a connector outer frame) has no particular datum face.

Figure 3C:
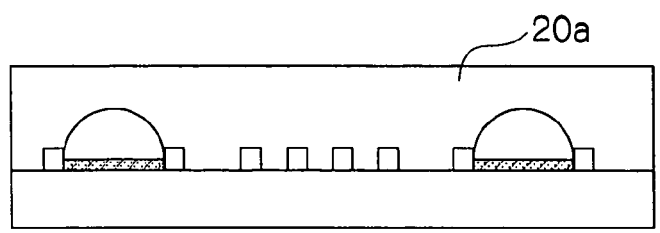
Figure 3D:
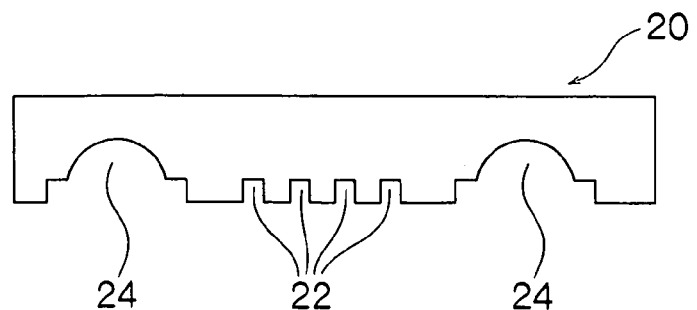

Next, as shown in FIGS. 3C and 3D, a mold is produced by: applying by coating or injecting a curable resin for mold formation to the projected portion corresponding to the optical waveguide core of the master plate produced in the above-described manner and the projected portions for forming the recessed portions for receiving the sleeves; optionally subjecting the applied resin to a drying treatment; curing the resin; and separating the cured resin layer from the master plate. In FIG. 3C, 20a represents a cured resin layer of the curable resin for forming the mold and 20 represents the mold, respectively. In FIG. 3D, 20 represent a mold; 22 represents the recessed portion corresponding to the projected portion of the optical waveguide core; and 24 represents the recessed portions for receiving the sleeves for connectors.

Figure 4A:
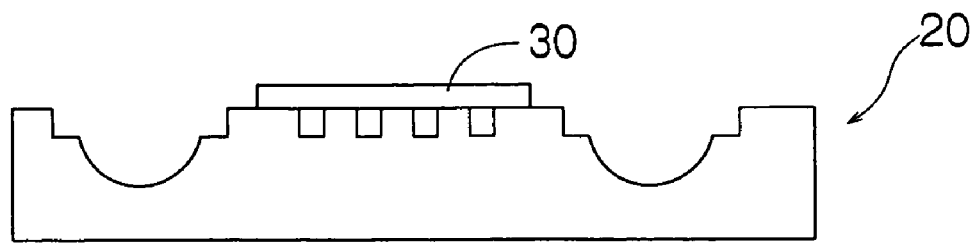
FIGS. 4A to 4C are conceptual illustrations, respectively showing the processes of producing a connector-integrated type polymer optical waveguide of the invention (the processes from closely attaching a clad film to a mold to producing a core).
Figure 4B:
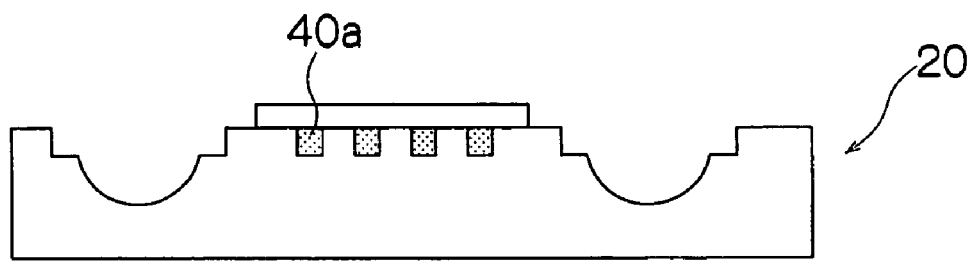
Figure 4C:
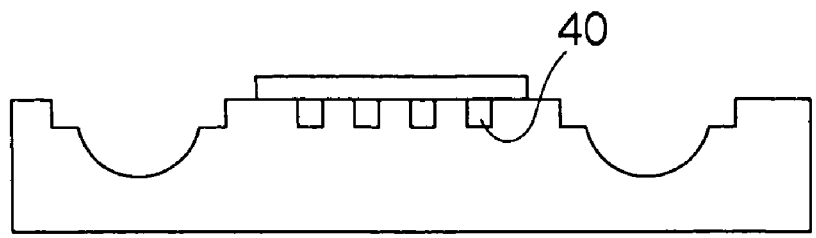

Next, as shown in FIG. 4A, a film substrate 30 for clad is closely attached so as to cover a region where the recessed portion(s) corresponding to the projected portion(s) of the optical waveguide core are formed in the mold (at this stage, the length of the film substrate for clad in the longitudinal direction is to be adjusted so as to expose the recessed portions for receiving the sleeves at both end portions of the mold). Thereafter, as shown in FIG. 4B, the recessed portions corresponding to the optical waveguide, of the mold, is filled with the curable resin 40a for core formation and then, as shown in FIG. 4C, the curable resin for core formation is cured. In FIG. 4C, 40 represents the cured product of the curable resin for core formation, that is, an optical waveguide core.

Next, as shown in FIG. 5A, connector sleeves 70 are set in the two recessed portions for receiving the connector sleeves in the mold. In the state shown in FIG. 5A, the two sleeve centers 70c and the four core centers 40c are substantially on the same plane.

Figure 5B:
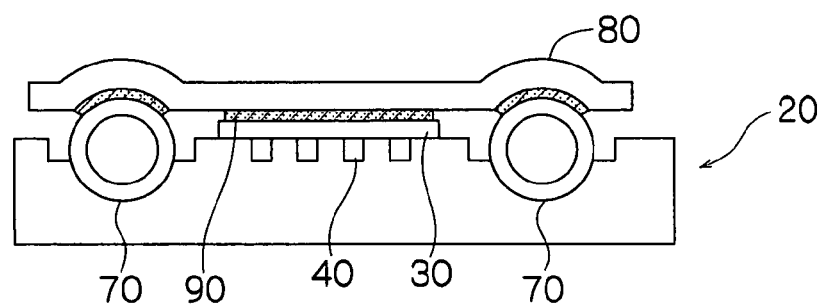

Further, a rigid member for connector formation 80 (refer to FIG. 1A) of a size which covers at least a portion of each sleeve and the end portions of the polymer optical waveguide is fixed to the connector sleeves 70 and the film substrate 30 for clad by an adhesive layer 90 (refer to FIG. 5B).

Figure 5C:
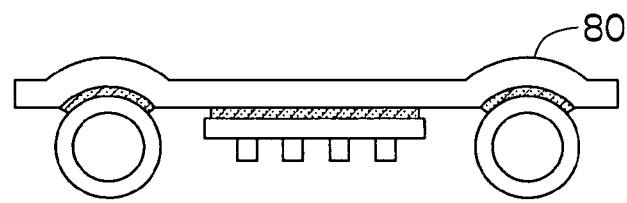

After that, the mold is separated (refer to FIG. 5C) and a clad layer 50a (a side face clad layer) and a clad layer 50b (a top face clad layer) are formed on the side faces and the top face of the optical waveguide core, respectively (refer to FIG. 5D), to obtain a connector-integrated type polymer optical waveguide of the invention.

Figure 5D:
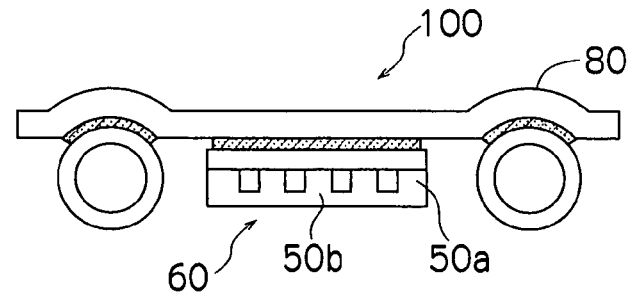
Figure 5E:
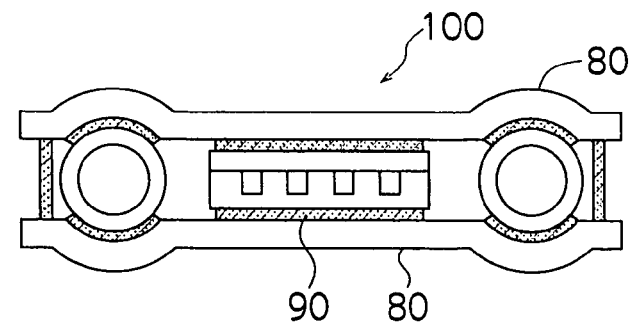

Further, as shown in FIG. 5E, another rigid member for connector formation 80 may optionally be fixed on the top face clad layer 50b and the sleeves 70 by way of an adhesive layer 90 such that the two rigid members sandwich the optical waveguide and the sleeves. In this case, the structure stability of the connector-integrated type polymer optical waveguide is further more improved and deformation thereof will less likely to occur.

In the production method of the connector-integrated type polymer optical waveguide of the invention, when the sleeves are set in the recessed portions for receiving the connector sleeves in the mold, the resulting sleeve centers and the center of the optical waveguide core, of the connector-integrated type polymer optical waveguide, are naturally positioned substantially on the same plane, only if the sleeve centers and the centers of the recessed portions corresponding to the projected portions of the optical waveguide core are positioned so as to be substantially on the same plane. Therefore, the production method of the connector-integrated type polymer optical waveguide of the invention is a very simple and low-cost production method in which the production processes have greatly been simplified.

The performance of the connector-integrated type polymer optical waveguide produced according to the method of the invention is as excellent as that of a connector-integrated type polymer optical waveguide produced by a conventional costly method including the complicated alignment process.

Further, since a connector sleeve of a simple shape (e.g., a cylinder) may be used as the connector sleeve whose dimension must be highly precise, a relatively inexpensive member such as a stainless tube can be used as the sleeve, which contributes to cost reduction.

According to the production method of the polymer optical waveguide of the invention, the shape of the polymer optical waveguide can basically be set, as desired, with less transmission loss and higher precision than the conventional method. That is, a flexible polymer optical waveguide which is applicable to variety of devices, as desired, can be obtained.

Further, the production method of the connector-integrated type polymer optical waveguide of the invention will be described further in details hereinafter.

<1> preparing a mold made of a cured resin layer of a curable resin for mold formation and having a recessed portion corresponding to a projected portion of an optical waveguide core and recessed portions for receiving the connector sleeves <Production of a Master Plate>

When the projected portion corresponding to the optical waveguide core and the projected portions for positioning the sleeves, on the substrate, are formed at the same height, these projected portions can be formed easily by photolithography. However, the method of forming the projected portion corresponding to the optical waveguide core and the projected portions for positioning the sleeves, on the master plate, is not limited to photolithography, and examples of the method include the film-forming in the method of producing a polymer optical waveguide by electrodeposition or photoelectrodeposition (disclosed in Japanese Patent Application No. 2002-10240, which is owned by the applicant of the present application).

The shape of the connector sleeves is not limited to a cylindrical shape. For example, a sleeve having a rectangular outer shape and a cylindrically hollowed inner space may be employed. Accordingly, the sectional shape of the pin is not limited to a semicircular but may be any suitable shape which adapted to the shape and size of the connector sleeve in use (in the case of cylindrical sleeves, sleeves with a high precision can relatively easily be obtained. Thus, as compared with the methods employing sleeves of other specific shapes, which methods require high precision, a connector-integrated type polymer optical waveguide can be produced at a low cost by cylindrical sleeves).

The pins can be produced from materials such as a stainless steel, aluminum, and glass and can be processed into desired shapes and sizes by the means of machine processing.

The size of the projected portion corresponding to the optical waveguide core can be determined in accordance with the application of the polymer optical waveguide. For example, in the case of an optical waveguide of a single mode, a core with 5 to 10 $\mu$m square and in the case of an optical waveguide of a multiple mode, a core with 50 to 100 $\mu$m square are generally employed. However, depending on the application, optical waveguides having core portions with several hundred $\mu$m and further larger core portions may be utilized.

[Production of the Mold]

The mold is, as described above, produced by: applying by coating or injecting a curable resin for mold formation to the surface where the projected portions have been formed, of the master plate produced in the above-described manner; optionally drying the curable resin; curing the resin; and separating the cured resin layer from the master plate.

Further, as shown in 4A to 4C, in the case in which the film substrate for clad is closely attached to the top of the mold while the molding being set under the film substrate, it is preferable that a liquid reservoir portion (a liquid reservoir hole) for the curable resin for core formation, which reservoir portion communicates with the recessed portion corresponding to the projected portion of the optical waveguide core, is formed at one end portion of the mold. A single liquid reservoir portion may be provided such that the liquid reservoir communicates with the respective recessed portions. Alternatively, single liquid reservoir portions of the same number as the recessed portions may be provided such that each liquid reservoir portion corresponds to each recessed portion.

Further, at the other end portion of the mold, a vacuum suction portion (a vacuum suction hole) may be provided so as to communicate with the recessed portions corresponding to the projected portions of the optical waveguide core and be capable of effecting vacuum suction to the recessed portion.

A single vacuum suction portion may be provided so as to communicate with the respective recessed portions. Alternatively, vacuum suction portions of the same number as the recessed portions may be provided.

Figure 6:
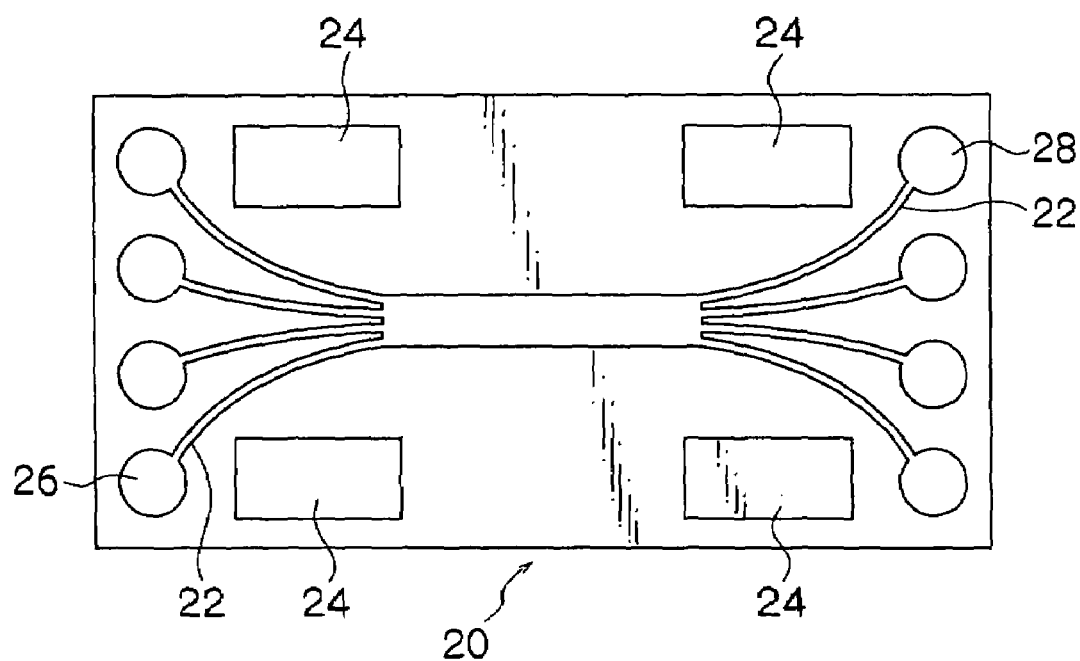
FIG. 6 is a plan view showing one example of a mold to be used in the invention.

FIG. 6 shows a plan view of the mold having a liquid reservoir portion 26 at one end and a vacuum suction portion 28 at the other end of each recessed portion. The liquid reservoir portions and the vacuum suction portions may be employed such that each performs other's function, in an exchanged manner, in the process of charging the curable resin for core formation (refer to Example 1).

Figure 7:
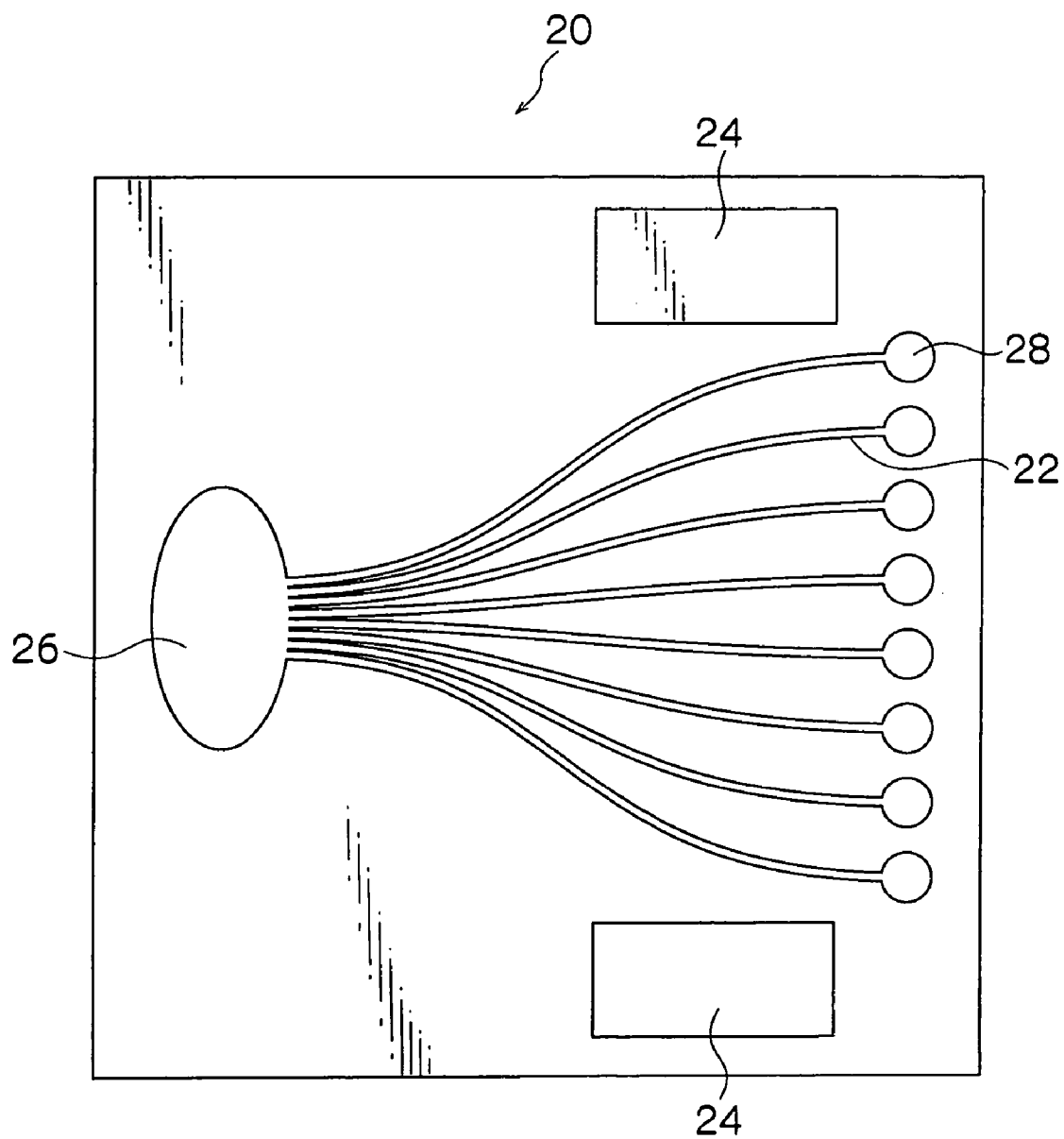
FIG. 7 is a plan view showing another example of a mold to be used in the invention.

FIG. 7 shows an example of a mold to be used when a pitch-varied-type polymer optical waveguide is produced, in which a single liquid reservoir portion 26 communicating with the respective recessed portions is provided on the narrow pitch side of the mold and vacuum suction portions of the number corresponding to that of the recessed portions 22 are provided on the wide pitch side of the mold.

In the case in which the mold is mounted on the film substrate set underneath the mold, an injection inlet for charging the recessed portions corresponding the projected portions with the curable resin for core formation and a discharge outlet for discharging the resin from the recessed portions corresponding to the projected portions are formed, with no limitation of the formation method thereof. It is acceptable that projections corresponding to the injection inlet and the discharge outlet are provided in advance in the master plate.

As an example of easily providing the injection inlet and the discharge outlet, the injection inlet and the discharge outlet can be formed by: forming a cured resin layer of a curable resin for mold formation in a master plate; obtaining the mold by separation; and then cutting both ends of the mold such that the recessed portions are exposed. In this case, a film substrate for clad having slightly larger size than the mold is used and the resin is charged in the recessed portions of the mold by setting a few drops of the curable resin for core formation on the film substrate for clad such that the resin is applied while it is in contact with the inlet.

The thickness of the cured resin layer may be set in consideration of the handling properties of the mold. An appropriate thickness of the cured resin layer is generally in a range of 0.1 to 50 mm or so.

It is preferable that the master plated is subjected to a releasing treatment such as application of a releasing agent thereto, in order to facilitate separation of the mold from the master plate.

The curable resin for mold formation preferably allows easy separation of the cured product from the master plate, has at least certain mechanical strength and size as a mold which is repeated used, has hardness enough for maintaining the recessed shape, and exhibits excellent adhesion to the film substrate for clad. Additives of various types may optionally be added to the curable resin for mold formation.

The viscosity of the curable resin for mold formation is preferably in a range of about 500 to 7,000 mPa·s, further preferably about 2,000 to 5,000 mPa·s, in terms of: easiness in application by coating or injection of the resin to a surface of the master plate; accurate transfer of the shapes of the projected portions corresponding to respective optical waveguide cores formed in the master plate to the mold; allowing few air bubbles to enter the resin so that defoaming is easy; and easiness in forming a resin cured layer of a few mm thickness (it should be noted that "the curable resin for mold formation" used in the present invention may include a resin which exhibits rubber-like resilence after being cured). A solvent for adjusting viscosity may be added to the resin by an amount which does not cause any adverse effect.

Preferable examples of the curable resin for mold formation include curable organopolysiloxane, which becomes silicone rubber (silicone elastomer) or silicone resin after being cured, in terms of achieving good releasing property, mechanical strength and size stability, hardness, and adhesion to the substrate for clad.

The above-described curable organopolysiloxane preferably includes methylsiloxane group, ethylsiloxane group and phenylsiloxane groups in the molecule thereof. Further, the above-described curable organopolysiloxane may be of any of the following types: one-component type; two-component type used in combination with a curing agent; a thermosetting type; a room temperature curable type (for example those which are cured by moisture in air); and those having other curing mechanisms (such as UV curing).

As the above-mentioned curable organopolysiloxane, that which becomes silicone rubber after being cured is preferable. Examples of such silicone rubber includes so-called "liquid-state silicone rubber" (this "liquid-state silicone rubber" may have high viscosity like a paste). The curable polyorganosiloxane is preferably of two-liquid type used in combination with a curing agent. A liquid-state silicone rubber of addition type is especially preferable because such a liquid-state silicone rubber is cured rapidly and evenly both in the surface and the inside thereof, produces no or, if any, very little byproduct, exhibits excellent mold-releasing property and a small shrinkage ratio.

Among the above-mentioned liquid-state silicon rubber, liquid-state dimethylsiloxane rubber is especially preferable in terms of the adhesion property, the releasing property, the strength, and the hardness. Further, the cured product of the liquid-state dimethylsiloxane rubber generally has a low refractive index, which is approximately 1.43, and therefore, a mold produced from the rubber can be used as a clad layer as it is without being separated from the substrate for clad. In such a case, it is necessary to prevent separation of the charged resin for core formation and the substrate for clad from the mold.

The surface energy of the mold is preferably in a range of 10 dyn/cm to 30 dyn/cm, more preferably in a range of 15 dyn/cm to 24 dyn/cm, in terms of the adhesion property to the film substrate.

The Share rubber hardness of the mold is in a range of 15 to 80, preferably in a range of 20 to 60, in terms of the molding performance, the retainability of the recessed shape, and the releasing property.

The surface roughness of the mold (mean square roughness (RMS)) is preferably adjusted to be 0.5 $\mu$m or less, more preferably 0.1 $\mu$m or less in terms of the molding performance.

In the case of using UV curable resin as the curable resin for core formation and radiating UV rays to the resin through the mold, the mold preferably exhibits light-transmittance of no lower than 80% to light in the UV region (250 nm to 400 nm).

The above-mentioned curable organopolysiloxane, especially the liquid-state silicone rubber which becomes silicone rubber after being cured, is excellent in the conflicting two properties, i.e., adhesion and releasing properties, to the substrate for clad, is capable of transferring the nano-structure, and even capable of blocking entry of liquid when the silicone rubber is in close contact with the substrate for clad.

The mold produced using such silicon rubber can transfer the configurations of the master plate at high precision and can closely be attached to the substrate for clad. Therefore, the resin for core formation can be charged efficiently only in the recessed portions between the mold and the substrate for clad. Thus, the substrate for clad can be separated easily from the mold. As a result, a polymer optical waveguide which has highly precise shape and stably maintains the shape can very easily be produced by using the mold.

In a case in which the above-mentioned cured resin layer exhibits rubber elasticity like a cured product of curable liquid-phase silicone rubber, a portion of the cured resin layer, specifically, a portion other than the portions where the configurations of the projected portions of the master plate are to be transferred can be replaced with another rigid material. In this case, the handling property of the mold is improved. For example, there can be employed a method of: preparing a surface-polished metal plate; forming recessed portions by precision diesinking of the polished surface of the metal plate; applying, by coating, the aforementioned curable liquid-state silicone rubber to at least the surfaces of the recessed portions corresponding to the optical waveguide core and the vicinities thereof; and curing the resin, thereby forming a silicone rubber thin film.

Alternatively, there can be used another method of: applying, by coating, the curable liquid-state silicone rubber to the master plate; covering the master plate with a rigid plate; curing the applied silicone rubber, thereby integrating the rigid plate with the cured resin layer.

A mold obtained by using a master plate produced by the above-mentioned method, producing recessed dies made of nickel by an electroforming method, and applying the curable liquid state silicone rubber in several μm thickness to the recessed portions made of nickel by a dip coating method can sufficiently function as a mold for the invention. That is, the mold can function as a mold described in the following examples (the flexure of the mold generated when the connector sleeves are set in the recessed portions of the mold is negligible).

Further, it is possible to use the mold as clad layers (on side faces and top face) without separating the mold (the method claimed in claim 15 of the accompanying claims). In this case, it is necessary that the cured resin layer of the curable resin for mold formation is light transmissible and the difference in refractive index between the cured resin layer and the core formed in the above-described process <4> is 0.01 or more.

<2> A process of closely attaching a film substrate for clad to the above-mentioned mold.

The optical waveguide of the invention may be used as a coupler, optical wiring between boards, and an optical branching filter. Accordingly, the material for the above-mentioned film substrate is selected in consideration of the application of the optical waveguide, as well as the refractive index, the optical characteristics such as light transmittance, the mechanical strength, the heat resistance, the adhesion to the mold, flexibility and the like, of the material.

It is preferable to produce a flexible polymer optical waveguide by using a flexible film substrate. Examples of the film include an alicyclic acrylic resin film, an alicyclic olefin resin film, a cellulose triacetate film, and a fluorine-containing resin film and the like.

The refractive index of the film substrate is preferably smaller than 1.53, and more preferably smaller than 1.52 in order to ensure a sufficiently large difference in refractive index between the film substrate and the optical waveguide core.

As the above-described alicyclic acrylic resin, OZ-1000, OZ-1100 (manufactured by Hitachi Chemical Co., Ltd.) having alicyclic hydrocarbons such as tricyclodecane introduced into ester substituent groups may be used.

As the above-mentioned alicyclic olefin resin, those having norbornene structure in the main chains and those having norbornene structure in the main chains and polar groups such as alkyloxycarbonyl groups in the side chains (as alkyl groups, alkyl groups with 1 to 6 carbon Among these examples, the alicyclic olefin resin having norbornene structure in the main chain and polar groups such as alkyloxycarbonyl groups in the side chains is particularly suitable for production of the polymer optical waveguide of the invention, because it has low refractive index (the refractive index thereof is about 1.50 and therefore a sufficiently large difference in refractive index between the core and the clad can be ensured) and excellent optical characteristics such as high light transmittance, exhibits excellent adhesion to the mold and is excellent in heat resistance.

The thickness of the film substrate is selected in consideration of flexibility, rigidity, and handling easiness, and is in general preferably in a range of 0.1 mm to 0.5 mm.

Further, as the film substrate for clad, a film having copper patterns for electrodes in a film form provided on the face opposite to the optical waveguide core-formed face can also be used. In this case, the curing of the UV curable resin as the curable resin for core formation is carried out through the mold.

<3> A process of filling the recessed portion in the mold having the film substrate for clad closely attached thereon, with a curable resin for core formation In this process, the recessed portion of the mold is filled with the curable resin for core formation from one end side of the recessed portion of the mold, due to the capillary phenomenon, and the curable resin for core formation is simultaneously discharged from the other end side of the recessed portion.

As the curable resin for core formation, radiation curable, electron beam curable, and thermosetting resins may be used. Among these resins, UV curable resin and thermosetting resin are preferably used.

As the UV curable resin or thermosetting resin for core formation, UV curable or thermosetting monomers, oligomers, or mixtures of monomers and oligomers are preferably used.

As the UV curable resin, epoxy-based, polyimide-based, or acrylic UV curable resin is preferably used.

Since the curable resin for core formation is charged in a space (the recessed portion of the mold) formed between the mold and the film substrate, due to the capillary phenomenon, the curable resin for core formation in use needs to have a sufficiently low viscosity so as to enable such charging. Accordingly, the viscosity of the curable resin is preferably in a range of 10 mPa·s to 2,000 mPa·s, more preferably 20 mPa·s to 1,000 mPa·s, and further more preferably 30 mPa·s to 500 mPa·s.

Further, in order to reproduce the original shape of the projected portion corresponding to the optical waveguide core formed in the master plate at high precision, it is necessary for the curable resin to exhibit a relatively small change in volume between before and after the curing. For example, if the volume is decreased too much, such a decrease results in transmission loss. Accordingly, it is preferable that the above-mentioned curable resin exhibits as little change in volume in the curing process, which change is preferably 10% or less, and more preferably 6% or less. It is preferable that use of the solvent for lowering the viscosity is avoided since then change in volume between before and after the curing becomes significantly large.

In order to reduce change in volume (shrinkage) of the curable resin for core formation between before and after the curing, a polymer may be added to the resin. A polymer which is compatible with the curable resin for core formation and do not cause any adverse effect on refractive index, elastic modulus, and transmission properties of the resin is preferable.

Addition of the polymer not only reduces change in volume during the curing process but also enables highly precise control of the viscosity and the glass transition point of the curable resin.

As the polymer, for example, acrylic, methacrylic, and epoxy-based polymers may be used. However, the type of the polymer is not limited to these examples.

The refractive index of a cured product of the curable resin for core formation needs to be larger than that of the above-mentioned film substrate to form a clad (the film substrate includes the clad layer in the process <7> described below). Specifically, the refractive index of a cured product needs to be 1.52 or more, and preferably 1.54 or more. The difference in refractive index between the clad (the clad includes the clad layer in the process <7> and the optical waveguide core is to be 0.01 or more, and preferably 0.03 or more.

In this process, in order to facilitate the filling of the recessed portion of the mold with the curable resin for core formation due to the capillary phenomenon, it is preferable to decrease the pressure in the entire system by approximately 0.1 to 200 Pa. Alternatively, instead of decreasing the pressure in the entire system, it is possible to suck the curable resin from another end of the mold, which is different from one end at which the curable resin is in contact with the recessed portion, by a pump. Or, it is possible to apply pressure at the one end of the mold at which end the curable resin is in contact with the recessed portion. In the case of effecting suction by a pump, the applied negative pressure relative to the atmospheric pressure is preferably about 0.1 kPa to 80 kPa.

Further, in order to facilitate the filling, in addition to reducing the pressure in the system, heating the curable resin for core formation to be charged via the injection inlet of the mold and thereby reducing the viscosity of the resin is also effective.

<4> A process of curing the charged curable resin for core formation;

The charged curable resin for core formation is cured. To cure the UV curable resin, a UV lamp, a UV LED, a UV radiation apparatus and the like are employed. To cure the thermosetting resin, heating in an oven or the like is employed. In the case of the thermosetting resin, the respective curable resins in the recessed portions of the mold needs to be heated evenly or radiated evenly with UV rays.

In the case of radiating UV rays, UV rays are radiated though the film substrate for clad or the mold in the normal direction with respect to the film substrate for clad.

(5) A process of mounting the connector sleeves in the recessed portions for receiving connector sleeves in the mold The rigid member for connector formation to be used in the invention functions to fixedly hold the connector sleeves and the film substrate for clad and keep the relative positions of the connector sleeves and the film substrate for clad constant. Accordingly, it is preferable that the rigid member for connector formation exhibits relatively small deformation or displacement, when the environment is changed or pressure is applied thereto. Thus, a pressed metal plate product such as stainless steel, a molded body of resin or glass or a mixture of resin and metal, and a ceramic sintered body are preferably used.

The appropriate thickness of the rigid member for connector formation differs depending on the material to be used. In consideration of the rigidity of the material, the outer shape of the connector and the like, the thickness of the rigid member for connector is generally in a range of 0.3 to 5 mm.

(6) A process of fixing a rigid member for connector formation to the connector sleeves and the film substrate for clad with an adhesive layer At the time of fixing a rigid member for connector formation to the connector sleeves and the film substrate for clad with an adhesive layer, if the temperature is changed during the adhesion process, the relative positions of the sleeve center and the optical waveguide core center may change by the time the adhesion is completed. Therefore, the adhesive to be used for the fixation of the rigid member for connector formation is preferably an adhesive curable and being made adhesive at the room temperature.

The portion where the rigid member for connector formation of the connector-integrated type polymer optical waveguide is fixed need not be light-transmissive. Thus, any adhesive which is curable at the room temperature, exhibits little curing shrinkage and is capable of bonding the connector sleeves and the film substrate for clad to the rigid member for connector formation can be used, of which examples include epoxy-based or cyanoacrylate-based adhesive of two-component-mixing type.

In order to suppress the effect of the curing shrinkage minimum, it is preferable that the thickness of the adhesive layer is generally even. To achieve this, the adhesion face of the rigid member for connector formation preferably has a shape which corresponds to the connector sleeves and the polymer optical waveguide. However, as the adhesion face of the rigid member for connector formation is not used as a datum, it suffices if the precision thereof is as good as that of the pressed metal plate product described above.

If there is a possibility that the mold is deformed due to the weight of the rigid member for connector formation itself at the time when the rigid member is bondingly fixed to the connector sleeves and the like, to an extent that the deformation cannot be corrected, another additional holding means can be used for effecting the bonding and fixation such that the weight of the rigid member for connector formation is applied on the mold.

On completion of the adhesion, the relative positions of the connector and the waveguide core are fixed.

<7> A process of separating the mold from the film substrate for clad

After the above-mentioned process <4>, the mold is separated form the film substrate for clad. The mold employed in the above-mentioned processes <1> to <3> can be used as a clad layer as it is if the mold satisfies the required conditions such as the refractive index and the like. In this case, the mold need not be separated and can be used as it is as a clad layer. In order to improve the adhesion between the mold and the core material, the mold is preferably subjected to the ozone treatment.

<8> A process of forming clad layers on the film substrate having the optical waveguide core provided thereon A clad layer is formed on the film substrate on which the optical waveguide core has been formed. Examples of the clad layer include a film (e.g. the film substrate for clad as used in the above-mentioned process <2>), a layer formed by applying, by coating, a curable resin for clad and curing the resin, a polymer film obtained by applying, by coating, a solvent solution of a polymer material and drying the polymer material, and the like.

As the curable resin for clad, UV curable resin and thermosetting resin are preferably used. Examples thereof include UV curable or thermosetting monomer, oligomer, and a mixture of the monomer and the oligomer.

In order to suppress a change in volume (shrinkage) of the curable resin for clad formation after being cured, a polymer may be added to the resin, which polymer has good compatibility with the resin and does not cause any adverse effects on refractive index, elastic modulus and the transmission characteristics of the resin (e.g. methacrylic polymer or epoxy-based polymer).

In the case a film is used as the clad layer, the film is laminated on the film substrate by using an adhesive. In this case, it is preferable that the refractive index of the adhesive is close to the refractive index of the film. As such an adhesive, UV curable resin or thermosetting resin is preferably used. Specific examples thereof include UV curable or thermosetting monomer, oligomer and a mixture of the monomer and the oligomer.

In order to suppress the change in volume (shrinkage) of the above-mentioned UV curable resin or thermosetting resin after being cured, a polymer similar to that added to the clad layer may be added thereto.

In order to ensure sufficiently large difference in refractive index between the clad layer and the optical waveguide, the refractive index of the clad layer is preferably 1.55 or less, and more preferably 1.53 or less. The smaller is the difference in refractive index between the substrate for the clad and the clad layer, the better. The difference is preferably within 0.05, more preferably 0.001, furthermore preferably nil, in terms of good enclosure of light.

<9> After the above-mentioned process <8>, another rigid member for connector formation may optionally be prepared attached to the connector-integrated type polymer optical waveguide, such that the two rigid members for connector formation sandwich the components from the above and under. In this case, a connector with higher structural stability can be obtained.

In the production method of the polymer optical waveguide of the invention, the combination of: liquid-state silicone rubber which is brought into a rubber-like state after being cured (liquid-state dimethylsiloxane rubber is especially preferable), as the curable resin for mold formation; and alicyclic olefin resin having norbornene structure in the main chain and alkyloxycarbonyl group in the side chain, as the film substrate for clad, is preferable because the combination achieves particularly good adhesion between the mold and the film substrate for clad. Further, in this combination, no deformation occurs in the structure of the recessed portion of the mold and, if the cross-sectional area of the recessed structure is extremely small (e.g. a square of 10×10 $\mu$m), the curable resin can be charged quickly in the recessed portions due to the capillary phenomenon.

Figure 8:
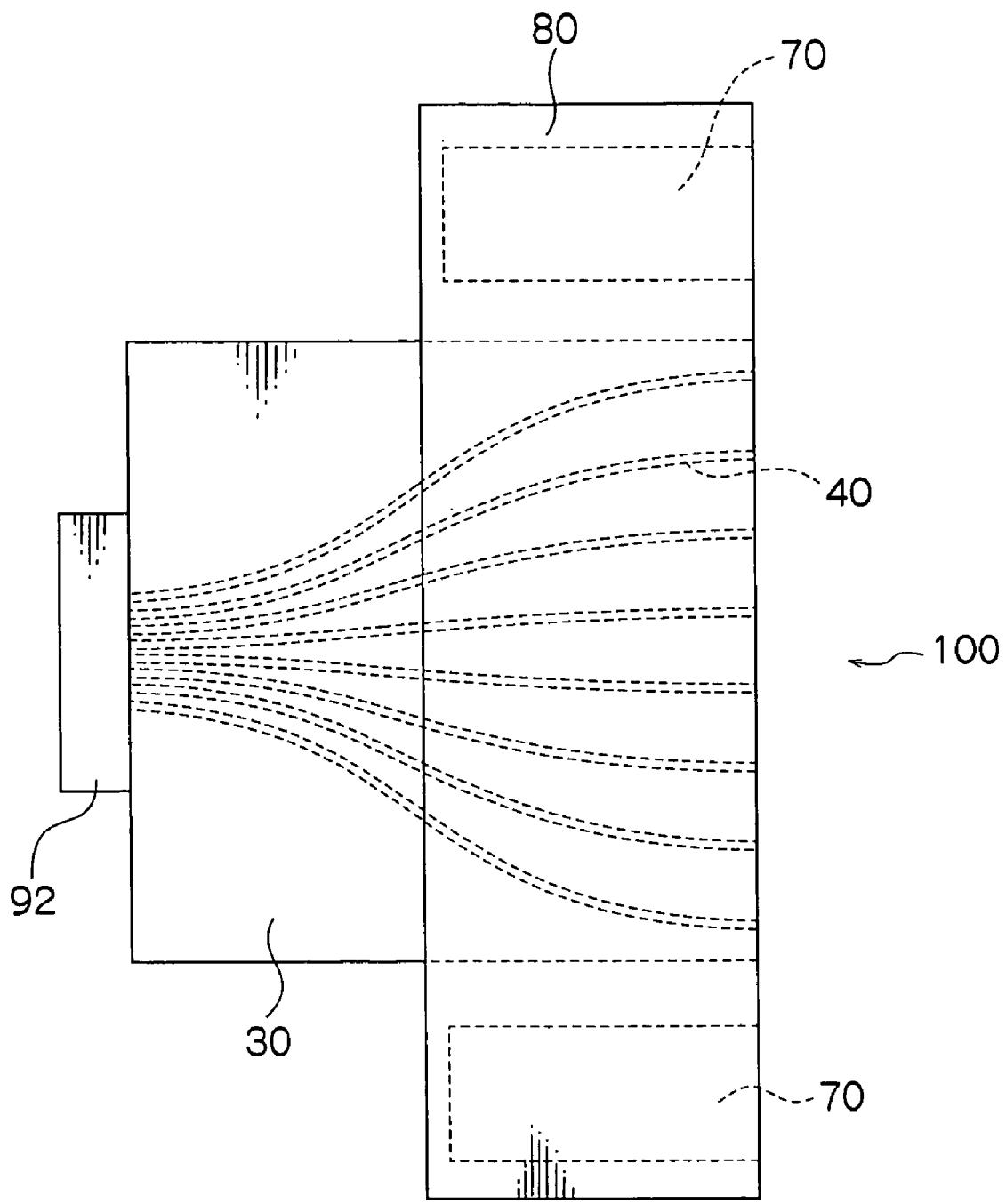
FIG. 8 is a plan view showing one example of a connector-integrated type polymer optical waveguide having a vertical cavity surface emitting laserdiode provided at one end of the optical waveguide core.

Further, the connector-integrated type polymer optical waveguide of the invention may be provided with a light-emission portion such as a surface-emitting laser array, at one end of the optical waveguide core. FIG. 8 shows a plan view showing one example of such an optical waveguide. A surface-emitting laser array is connected to one end of the polymer optical waveguide. A pair of the connector sleeves positioned so as to sandwich the optical waveguide core and a rigid member for connector formation are provided at the other end of the polymer optical waveguide. The film substrate for clad and the connector sleeves are fixed to the rigid member for connector formation.

In FIG. 8, 100 represents the connector-integrated type polymer optical waveguide; 92 represents the surface-emitting laser array; 80 represents the rigid member for connector formation; 70 represents connector sleeves; 40 represents the optical waveguide core; and 30 represents the film substrate for clad.

EXAMPLES

Hereinafter, the present invention will be described in detail with reference to Examples. It should be noted, however, that the present invention is not limited to these Examples.

Example 1

In this example, a connector-integrated type polymer optical waveguide having 4×4 branched optical waveguide core, as shown in FIGS. 1A and 1B, is produced.

At first, a resist as a thick film (SU-8 manufactured by Micro Chemical Co., Ltd.) is applied to a Si substrate by a spin coating method. Thereafter, the resist is prebaked at 80° C. and exposure through a photomask and development are effected, whereby: a projected portion corresponding to the 4×4 branched optical waveguide core [the cross-sectional area at the branched portion thereof is a square of 50 $\mu$m×50 $\mu$m, the cross sectional area of the projected portion at the mixing portion is a rectangle of 200 $\mu$m×10 mm, the pitches (i.e., the pitches of the projected portions at the positions corresponding to the core position observed at the cross-section obtained by cutting with a dicing saw, which will be described later) are 250 $\mu$m, and the length of the projected portion is the sum of the length of the dicing saw-cut portion and the entire length of the core (30 mm) including the mixing portion of the polymer optical waveguide to be formed]; and the projected portions for pin positioning, which are necessary for provision of the projected portions for forming the recessed portions for receiving the connector sleeves (the projected portions for pin positioning each has a square sectional line of 50 $\mu$m×50 $\mu$m and the inner-side rectangular dimension of 1.1 mm×8.05 mm, and the distance between the center of the rectangle defined by one pair of the projected portions for pin positioning and the center of the rectangle defined by another pair of projected portions for pin positioning is adjusted to be 4.6 mm for conformity with a commercialized MT connector) are formed (refer FIG. 3A). The obtained product is post-baked at 120° C.

Further, other four pins made of nickel and having a semicircular shape, a diameter of 1.1 mm and a length of 8.05 mm are also prepared.

By using the four pairs of projected portions for pin positioning formed as described above, as datum, the other four pins are foxed to the silicon substrate by an adhesive. The thickness of the adhesive layer is adjusted to be 20 $\mu$m. A master plate for producing a connector-integrated type polymer optical waveguide of the invention is thus obtained (refer to FIG. 3B).

Next, after a release agent is applied, by coating, to the master plate, a thermosetting dimethylsiloxane resin (SYL-GARD 184, manufactured by Dow Corning Corp.) is poured into the master plate as a mold, heated at 120° C. for 30 minutes for curing and then separated from the master plate, to obtain a structure in which recessed portions for a 4×4 branched optical waveguide core and recessed portions for receiving the connector sleeves have been formed (the thickness of the cured resin layer: 5 mm) (refer to FIG. 3D).

Further, circular holes (diameter 1 mm and depth 1 mm) which communicate with the recessed portions corresponding to the projected portions of the optical waveguide core, respectively, are formed in the above-mentioned cured resin layer, to form liquid reservoir portions and vacuum suction portions, whereby a mold is produced (refer to FIG. 6). The positions of the recessed portions for receiving the connector sleeves are at 4.6 mm pitches in accordance with a commercially-available MT connector.

The mold is set in such a manner that the recessed portions face the upper side. A film substrate for clad with length of 40 mm, a width of 2.5 mm, and a film thickness of 188 μm (Arton Film, manufactured by JSR Corp, the refractive index thereof 1.510) is closely attached so as to cover the region including the recessed portions for the optical waveguide core in the mold.

One hole of the liquid reservoir portions formed in the mold is fully filled with a UV curable resin (PJ3001, manufactured by JSR Corp.) with a viscosity of 1,300 mPa·s and neighboring three holes are closed by a cover. Then, the resin is sucked by a suction force of 20 kPa by using a diaphragm type suction pump (the maximum suction pressure of 33.25 kPa) from four holes of the vacuum suction portions located at the other end of the mold, whereby the recessed portions communicating with the liquid reservoir portions is filled with the UV-curable resin.

Next, the four holes in the vacuum suction portions are filled with the same resin and the resin is sucked by way of the aforementioned three closed or sealed holes in a manner similar to described above, so that the recessed portions corresponding to the optical waveguide core are filled with the UV curable resin. It takes 5 minutes to fill the recessed portions.

After that, UV rays with 50 mW/cm$^2$ dose are irradiated for 5 minutes through Arton Film to effect UV curing. The refractive index of the core is 1.59.

Cylindrical connector sleeves made of a stainless steel and having an inner diameter of 0.7 mm, a thickness of 0.2 mm, and a length of 8 mm are set in four recessed portions for receiving connector sleeves (refer to FIG. 5A). The portions of the mold where the sleeves are set are sagged about 5 μm due to the self-weight of the sleeves and stabilized in such a state. In this state, the center of the optical waveguide core of 50 μm square shape and the centers of the connector sleeves are substantially on the same plane.

Further, four other rigid members for connector formation are prepared. These members are obtained by press-working of stainless plates. Each of the stainless plates has a thickness of 0.7 mm, the length of 8 mm, and a width of 7 mm and the sleeve-contacting portions thereof are curved so as to extend along the semicircular portions of the connector sleeves.

A cyanoacrylate-based adhesive is applied to the inside of the rigid member for connector formation and, as shown in FIGS. 1A and 1B, the ends of the rigid member for connector formation are aligned with the ends of the sleeves, so that the rigid member for connector formation is attached to the sleeves and the film substrate for clad. In the same manner as this, another rigid member for connector formation is attached to the sleeves and the film substrate for clad at the other end side of the polymer optical waveguide.

On completion of the adhesion, the mold is separated (refer to FIG. 5C), and then Arton film with a length of 40 mm, a width of 2.5 mm, and a thickness of 188 μm is attached to the core formation face by using a UV curable resin adhesive having refractive index of 1.51, to form a side face clad layer and a top face clad layer (refer to FIG. 5D).

Further, the remaining two rigid members for connector formation are each attached to the sleeves and the clad layers in the same manner as described above (refer to FIG. 5E).

Finally the Arton film projecting out of the ends of the respective rigid members for connector formation are cut by a dicer, whereby a connector-integrated type polymer optical waveguide with the structure as shown in the schematic drawings FIGS. 1A and 1B is produced.

The completed connector-integrated type 4×4 branched polymer optical waveguide can be connected to an MT connector, which is joined to an optical fiber. In such a structure, the waveguide exhibits the branching uniformity of 10% and the average insertion loss of 3 dB. This insertion loss value is only slightly poorer (by 0.1 to 0.2 dB) than the structure having a similar branched structure and having subjected to precise alignment adjustment. The average insertion loss is 3.2 dB under the conditions of 70° C. temperature and 95% humidity.

Example 2

A connector-integrated type polymer optical waveguide is produced in a manner similar to that of Example 1, except that the rigid member for connector formation made of a stainless steel is set not at both upper and lower sides but only at one side (refer to FIG. 5D). The average insertion loss at the initial stage is 3 dB in such a structure, and the cost is significantly reduced, as compared with Example 1. However, as the average insertion loss is increased to 4 dB under the conditions of 70° C. temperature and 95% humidity, it is assumed that this structure is suitable for a connector used at the room temperature.

Example 3

Connector-integrated type polymer optical waveguides are produced in a manner similar to that of Example 1, except that the material of the rigid member of connector formation (a stainless plate in Example 1) is replaced with one of: a mixture of an epoxy resin and 70% by weight of a metal powder; a mixture of an epoxy resin and 70% by weight of glass; glass; and a ceramic sintered body, and that the two-component-mixing type epoxy resin is used as the adhesive for fixation.

Connector-integrated type polymer optical waveguides which achieve substantially the same performances as that of Example 1 are obtained. Further, in order to reduce cost, other connector-integrated type polymer optical waveguides are produced in a manner similar to that of Example 3, except that an aluminum die cast is used. In this case, the performances at the room temperature are substantially the same as those of Example 1. However, the insertion loss at a high temperature is increase to 3.4 dB.

Example 4

Connector-integrated type polymer optical waveguides are produced in a manner similar to that of Example 1, except that the material of the connector sleeve (a stainless tube in Example 1) is replaced with one of: zirconia; nickel; an epoxy resin; a mixture of an epoxy resin and a metal; and crystallized glass. Connector-integrated type polymer optical waveguides which achieve substantially the same performances as that of Example 1 are obtained.

Example 5

A connector-integrated type polymer optical waveguide is produced in a manner similar to that of Example 1, except the material of the film substrate for clad is replaced with Arton Film having copper patterns for electrodes provided on a surface thereof where the optical waveguide core is not formed, and that curing of the UV curable resin is carried out by irradiating UV rays of the same strength as Example 1 for 7 minutes from the lower face of the mold. As a result, a connector-integrated type polymer optical waveguides which achieve substantially the same performances as that of Example 1 is obtained.

Example 6

In the present Example, a connector-integrated type polymer optical waveguide, having pitch-varied-type optical waveguide core, is produced.

At first, a resist as a thick film (SU-8 manufactured by Micro Chemical Co., Ltd.) is applied to a Si substrate by a spin coating method. Thereafter, the resist is prebaked at 80° C. and exposure through a photomask and development are effected, whereby: a projected portion corresponding to eight optical waveguide cores [the cross-section of each projected portion is a square of 50 $\mu$m×50 $\mu$m, the pitch of the projected portion at a position corresponding to the core position observed at a cross-section obtained by cutting with a dicing saw is 250 $\mu$m, the pitch of the projected portion at a position corresponding to the core position observed at another cross-section obtained by cutting with a dicing saw is 2 mm, and the length of the projected portion is the sum of the length of the dicing saw-cut portion and the entire length of the core (15 mm) of the polymer optical waveguide to be formed]; and the projected portions for pin positioning, which are necessary for provision of the projected portions for forming the recessed portions for receiving the connector sleeves at the end portions of the 2 mm-pitched projected portions (the projected portions for pin positioning each has a square sectional line of 50 $\mu$m×50 $\mu$m and the inner-side rectangular dimension of 1.1 mm×8.05 mm, and the distance between the center of the rectangle defined by one pair of the projected portions for pin positioning and the center of the rectangle defined by another pair of projected portions for pin positioning is adjusted to be 20 mm) are formed. The obtained product is post-baked at 120° C.

Further, other two pins made of nickel and having a semicircular shape, a diameter of 1.1 mm and a length of 8.05 mm are prepared.

By using the two pairs of projected portions for pin positioning formed as described above, as datum, the two pins are foxed to the silicon substrate by an adhesive. The thickness of the adhesive layer is adjusted to be 20 $\mu$m. A master plate for producing a connector-integrated type polymer optical waveguide of the invention is thus obtained.

Next, after a release agent is applied, by coating, to the master plate, a thermosetting dimethylsiloxane resin (SYLGARD 184, manufactured by Dow Corning Corp.) is poured into the master plate as a mold, heated at 120° C. for 30 minutes for curing and then separated from the master plate, whereby a structure in which recessed portions for 8-channel, pitch-varied-type optical waveguide core and recessed portions for receiving the connector sleeves have been formed is produced (the thickness of the cured resin layer: 5 mm).

Further, ellipsoidal holes (long axis: 3 mm, short axis: 1 mm, depth: 1 mm) are formed such that the respective recessed portions on the 250 mm-pitch side are altogether exposed. Eight circular holes (diameter 1 mm and depth 1 mm) which communicate with the recessed portions on the 2 mm-pitch side, respectively, are formed to provide liquid reservoir portions and vacuum suction portions, whereby a mold is produced (refer to FIG. 7).

The mold is set in such a manner that the recessed portions face the upper side. A film substrate for clad with length of 20 mm, a width of 16 mm, and a film thickness of 188 $\mu$m (Arton Film, manufactured by JSR Corp, the refractive index thereof 1.510) is closely attached so as to cover the region including the recessed portions for the optical waveguide core in the mold.

Next, the hole formed on the 250 mm-pitch side of the mold is fully filled with a UV curable resin (PJ3001, manufactured by JSR Corp.) with a viscosity of 1,300 mPa·s. Then, the resin is sucked by a suction force of 20 kPa by using a diaphragm type suction pump (the maximum suction pressure of 33.25 kPa) from the eight holes on the 2 mm-pitch side of the mold, whereby all of the recessed portions in the mold are filled with the UV-curable resin. It takes 5 minutes to fill the recessed portions. After that, UV rays with 50 mW/cm$^2$ dose are irradiated for 5 minutes through Arton Film to effect UV curing. The refractive index of the core is 1.59.

Cylindrical connector sleeves made of a stainless steel and having an inner diameter of 0.7 mm, a thickness of 0.2 mm, and a length of 8 mm are set in the two recessed portions for receiving connector sleeves. The portions of the mold where the cylindrical sleeves are set are sagged about 5 $\mu$m due to the self-weight of the sleeves and stabilized in such a state. In this state, the centers of the optical waveguide cores of 50 $\mu$m square shapes and the centers of the connector sleeves are substantially on the same plane.

Further, two other rigid members for connector formation are prepared. These members are obtained by press-working of stainless plates. Each of the stainless plates has a thickness of 0.7 mm, the length of 8 mm, and a width of 7 mm and the sleeve-contacting portions thereof are curved so as to extend along the semicircular portions of the connector sleeves.

A cyanoacrylate-based adhesive is applied to the inside of the rigid member for connector formation, and the member is bonded to the sleeves and the film substrate for clad.

On completion of the adhesion, the mold is separated, and then Arton film with a length of 20 mm, a width of 16 mm, and a thickness of 188 $\mu$m is attached to the core formation face by using a UV curable resin adhesive having refractive index of 1.51, to form a side face clad layer and a top face clad layer.

Further, the other rigid member for connector formation is attached to the sleeves and the clad layers in the same manner as described above. Finally the Arton film projecting out of the ends of the respective rigid members for connector formation are cut by a dicing saw. The ends on the side of the core pitch being 250 $\mu$m are also cut by a dicing saw in the same manner.

The 250 $\mu$m-pitch side of the pitch-variable polymer optical waveguide completed in above-mentioned manner can be attached to a 1×8 VCSEL array (manufactured by Fuji Xerox Co., Ltd.) and the 2 mm-pitch side thereof can be attached to a connector comprising 8 POF whose entire core dimension is 200 $\mu$m. In such a structure, the average insertion loss value is 1 dB. The insertion loss value is only slightly poorer (by 0.1 to 0.2 dB) than that of an optical waveguide having a similar branched structure and subjected to precise alignment adjustment. The average insertion loss is 1.2 dB under the conditions of 70° C. temperature and 95% humidity.

In short, in the present example, a waveguide can be obtained which waveguide can efficiently lead a VCSEL array, whose degree of integration has been thus enhanced, to a POF with a large diameter without necessitating positioning alignment of the connectors.

The connector-integrated type polymer optical waveguide of the invention comprises, at least one end portion thereof, a rigid member for connector formation for integrally fixing the connector sleeves and a film substrate for clad. Thus, the waveguide is excellent in the structure stability. Further, as the rigid member for connector formation is formed at an end portion of the polymer optical waveguide and the rest of the portions of the waveguide may be flexible, the degree of freedom in application thereof is increased.

Further, in the method of producing the connector-integrated type polymer optical waveguide of the invention, the sleeve center of the connector-integrated type polymer optical waveguide and the center of the optical waveguide core can be positioned substantially on the same plane, only by forming the waveguide such that the sleeve center and the center of each recessed portion corresponding to the projected portion of the optical waveguide core are substantially on the same plane and setting the sleeves in the recessed portions for receiving the sleeves. Accordingly, the production method of the invention is a very simple and low-cost method which enables production of a connector-integrated type polymer optical waveguide of good quality.

Further, performance of a connector-integrated type polymer optical waveguide produced by the above-described method of the invention is as excellent as that of a connector-integrated type polymer optical waveguide produced by the conventional, costly method using complicated alignment process.

Further, since a connector sleeve of a simple shape (e.g., a cylinder) may be used as the connector sleeve whose dimension must be highly precise, a relatively inexpensive member such as a stainless tube can be used as the sleeve, which contributes to cost reduction.

What is claimed is:

1. A connector-integrated type polymer optical waveguide, comprising:
    an optical waveguide including a film substrate for clad, an optical waveguide core provided on the film substrate, and a clad layer formed on side faces and a top face of the core;
    a pair of connector sleeves formed at positions at which the connector sleeves sandwich the optical waveguide core at least in one end portion of the polymer optical waveguide; and
    a rigid member for connector formation,
    wherein the film substrate for clad and the connector sleeves are fixed to the rigid member for connector formation in such a state that the center of the optical waveguide core and the center for connector sleeves are substantially on the same plane.

2. The connector-integrated type polymer optical waveguide described in claim 1, wherein the non-fixed face sides of the clad layer and the pair of the connector sleeves are fixed by another rigid member for connector formation.

3. The connector-integrated type polymer optical waveguide described in claim 1, wherein the film substrate for clad and the connector sleeves are fixedly attached to the rigid member for connector formation with an adhesive.

4. The connector-integrated type polymer optical waveguide described in claim 1, wherein the rigid member for connector formation has a fixation face of a shape substantially corresponding to the pair of the connector sleeves and the film substrate for clad.

5. The connector-integrated type polymer optical waveguide described in claim 1, wherein the rigid member for connector formation is a press-machined product of a metal plate, a molded body of a resin or a mixture of a resin and a metal, a molded body of glass, or a sintered molded body of ceramic.

6. The connector-integrated type polymer optical waveguide described in claim 1, wherein the connector sleeves are made of a material selected from the group consisting of zirconia, nickel, stainless steel, a resin, a mixture of a resin and a metal, and a crystallized glass.

7. A method of producing a connector-integrated type polymer optical waveguide, comprising:
    preparing a mold made of a cured resin layer of a curable resin for mold formation and having a recessed portion corresponding to a projected portion of an optical waveguide core and recessed portions for receiving at least one pair of connector sleeves;
    closely attaching a film substrate for clad to the mold;
    filling the recessed portion corresponding to the projected portion of the optical waveguide core in the mold having the film substrate for clad closely attached thereon, with a curable resin for core formation;
    curing the charged curable resin for core formation;
    mounting connector sleeves in the recessed portions for receiving connector sleeves in the mold;
    fixing a rigid member for connector formation to the connector sleeves and the film substrate for clad with an adhesive layer;
    separating the mold from the film substrate for clad; and
    forming a clad layer on side faces and a top face of the formed optical waveguide core,
    wherein the mold is adapted such that, when the connector sleeves are set in the recessed portions for receiving the connector sleeves in the connector sleeve-setting process, the center of the recessed portion corresponding to the projected portion of the optical waveguide core and the center of the connector sleeves are substantially on the same plane.

8. The connector-integrated type polymer optical waveguide production method as described in claim 7, wherein the mold is produced from a master plate having the projected portion corresponding to the optical waveguide core and the projected portions for forming the recessed portions for receiving the connector sleeves.

9. The connector-integrated type polymer optical waveguide production method described in claim 8, wherein the projected portions for forming the recessed portions of for receiving the connector sleeves are formed in the master plate by using a projected portion for positioning.

10. The connector-integrated type polymer optical waveguide production method described in claim 8, wherein the center of the projected portion corresponding to the optical waveguide core and the center for the projected portions for forming the recessed portions for receiving the connector sleeves, of the master plate, are substantially on the same plane.

11. The connector-integrated type polymer optical waveguide production method described in claim 7, wherein the process of mounting the connector sleeves in the recessed portions for receiving connector sleeves in the mold is carried out after the process of preparing the mold and before the process of fixing the rigid member for connector formation to the connector sleeves and the film substrate for clad.

12. The connector-integrated type polymer optical waveguide production method described in claim 7, wherein the curable resin for core formation is a UV curable resin and UV rays are irradiated by way of the film substrate for clad or the mold in the normal direction with respect to the film substrate for clad in the process of curing the charged curable resin for core formation.

13. The connector-integrated type polymer optical waveguide production method described in claim 7, wherein the adhesive is a curable adhesive of room temperature curing type.

14. The connector-integrated type polymer optical waveguide production method described in claim 7, wherein at least the surfaces of the recessed portion corresponding to the projected portion of the optical waveguide core and the recessed portions for receiving the connector sleeves and the vicinities thereof, of the cured resin layer of the mold, are formed by a cured product of a liquid silicone rubber.

15. A connector-integrated type polymer optical waveguide production method according to claim 7, further comprising, after forming the clad layers in the side faces and in the top face of the thus formed optical waveguide core, fixing another rigid member for connector formation to the exposed faces of the connector sleeves and the top clad layer such that the polymer optical waveguide is sandwiched between the rigid member for connector formation and another rigid member for connector formation.

16. A mold used in the method of producing a connector-integrated type polymer optical waveguide of claim 7, comprising:
   a recessed portion corresponding to a projected portion of the optical waveguide core; and
   recessed portions for receiving the connector sleeves,
   wherein the mold is adapted such that, when the connector sleeves are set in the recessed portions, the center of the recessed portion corresponding to the projected portion of the optical waveguide core and the center of the connector sleeves are substantially on the same plane.

17. A connector-integrated type polymer optical waveguide production method, comprising:
   preparing a mold made of a cured resin layer of a curable resin for mold formation and having a recessed portion corresponding to a projected portion of an optical waveguide core and recessed portions for receiving at least one pair of connector sleeves;
   closely attaching a film substrate for clad to the mold;
   filling the recessed portion corresponding to the projected portion of the optical waveguide core in the mold having the film substrate for clad closely attached thereon, with a curable resin for core formation;
   curing the charged curable resin for core formation;
   mounting the connector sleeves in the recessed portions for receiving connector sleeves in the mold; and
   fixing a rigid member for connector formation to the connector sleeves and the film substrate for clad with an adhesive layer,
   wherein the cured resin layer of the curable resin for the mold formation is light transmissible and the difference in the refractive index between the cured resin layer and the core formed in the process of curing the charged curable resin is 0.01 or more, and the mold is adapted such that, when the connector sleeves are set in the recessed portions for receiving the connector sleeves in the process of mounting the connector sleeves in the recessed portions for receiving connector sleeves in the mold, the center of the recessed portion corresponding to the projected portion of the optical waveguide core and the center of the connector sleeves are substantially on the same plane.

18. A mold used in the method of producing a connector-integrated type polymer optical waveguide of claim 17, comprising:
   a recessed portion corresponding to a projected portion of the optical waveguide core; and
   recessed portions for receiving the connector sleeves, wherein the mold is adapted such that, when the connector sleeves are set in the recessed portions, the center of the recessed portion corresponding to the projected portion of the optical waveguide core and the center of the connector sleeves are substantially on the same plane.

19. A connector-integrated type polymer optical waveguide, comprising:
   a polymer optical waveguide including at least a film substrate for clad and an optical waveguide core provided on the film substrate for clad;
   a pair of connector sleeves formed at positions at which the connector sleeves sandwich the optical waveguide core at least in one end portion of the polymer optical waveguide;
   a first rigid member for connector formation; and
   a second rigid member for connector formation,
   wherein the film substrate for clad and the connector sleeves are fixed to the first rigid member for connector formation such that the center of the optical waveguide core and the center for connector sleeves are substantially on the same plane and,
   the second rigid member for connector formation is fixed to the polymer optical waveguide and the pair of connector sleeves such that the polymer optical waveguide and the pair of the connector sleeves are sandwiched between the first rigid member for connector formation and the second rigid member for connector formation.

20. The connector-integrated type polymer optical waveguide according to claim 19, wherein the second rigid member for connector formation is made of a light transmissible material and the difference in refractive index between the material and the optical waveguide core is 0.01 or more.

* * * * *